US012662053B2

(12) United States Patent
Motozaki et al.

(10) Patent No.: US 12,662,053 B2
(45) Date of Patent: Jun. 23, 2026

(54) METER DISPLAY DEVICE FOR A VEHICLE

(71) Applicant: TOYOTA JIDOSHA KABUSHIKI KAISHA, Toyota (JP)

(72) Inventors: Masaki Motozaki, Toyota (JP); Shinsuke Omori, Toyota (JP); Moto Takabatake, Mountain View, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/748,619

(22) Filed: Jun. 20, 2024

(65) Prior Publication Data

US 2025/0001941 A1 Jan. 2, 2025

(30) Foreign Application Priority Data

Jun. 30, 2023 (JP) ................................. 2023-108947

(51) Int. Cl.
B60R 1/27 (2022.01)
G09G 3/00 (2006.01)
H04N 7/18 (2006.01)

(52) U.S. Cl.
CPC .............. B60R 1/27 (2022.01); G09G 3/001 (2013.01); H04N 7/181 (2013.01); B60R 2300/105 (2013.01); B60R 2300/20 (2013.01); G09G 2380/10 (2013.01)

(58) Field of Classification Search
CPC . B60R 1/27; B60R 2300/105; B60R 2300/20; B60R 1/26; B60R 1/20; B60R 1/29; G09G 3/001; G09G 2380/10; H04N 7/181; B60K 35/22; B60K 35/29; B60K 35/85

USPC ................................................... 348/148, 159
See application file for complete search history.

(56) References Cited

U.S. PATENT DOCUMENTS

| | | | |
|---|---|---|---|
| 2015/0015457 A1* | 1/2015 | Takasu ................. | G09G 3/3406 345/7 |
| 2015/0070502 A1 | 3/2015 | Murayama et al. | |
| 2015/0168721 A1* | 6/2015 | Yamasaki .............. | B60K 35/50 345/7 |
| 2016/0266283 A1 | 9/2016 | Segawa | |
| 2016/0368417 A1* | 12/2016 | Bassi ..................... | B60K 35/10 |
| 2018/0046246 A1* | 2/2018 | Nishihashi ............. | B60K 35/22 |
| 2020/0269697 A1* | 8/2020 | Hayashida ............. | B60K 35/29 |
| 2022/0105899 A1* | 4/2022 | Ueno ..................... | H04N 23/65 |
| 2022/0172652 A1* | 6/2022 | Yagyu ................... | G09G 3/001 |
| 2023/0191911 A1* | 6/2023 | Izumi .................... | B60K 35/10 701/36 |

(Continued)

FOREIGN PATENT DOCUMENTS

| | | |
|---|---|---|
| JP | 2014-189213 A | 10/2014 |
| JP | 2015-054598 A | 3/2015 |

(Continued)

*Primary Examiner* — Asmamaw G Tarko
(74) *Attorney, Agent, or Firm* — Dinsmore & Shohl LLP

(57) ABSTRACT

A vehicle including: a meter display device that displays a meter video image at a front side of a vehicle cabin and at a vehicle front side of a driver's seat; and a camera display device that displays a camera video image capturing a peripheral field of view of the vehicle, at a position peripheral to the meter video image as viewed from the driver's seat and at a position that is offset toward a vehicle front side or a vehicle rear side with respect to the meter video image.

19 Claims, 10 Drawing Sheets

(56)                    References Cited

U.S. PATENT DOCUMENTS

| 2024/0071231 A1 * | 2/2024 | Nohara | .................. B60Q 3/217 |
| 2024/0083252 A1 | 3/2024 | Kamiya et al. | |

FOREIGN PATENT DOCUMENTS

| JP | 6187329 | B2 | 8/2017 |
| JP | 2021-146869 | A | 9/2021 |
| JP | 2023-034812 | A | 3/2023 |
| WO | 2015/102063 | A1 | 7/2015 |
| WO | 2022/244618 | A1 | 11/2022 |

* cited by examiner

METER DISPLAY DEVICE FOR A VEHICLE

CROSS-REFERENCE TO RELATED APPLICATION

This application is based on and claims priority under 35 USC 119 from Japanese Patent Application No. 2023-108947, filed on Jun. 30, 2023, the disclosure of which is incorporated by reference herein.

BACKGROUND

Technical Field

The present disclosure relates to a vehicle.

Related Art

Japanese Patent Application Laid-Open (JP-A) No. 2023-034812 discloses technology for displaying content for a vehicle in an area below a windshield. In this technology, a display device includes plural displays provided at a lower side of an instrument panel, and a reflective mirror disposed at a lower side of the plural displays. Content displayed at display faces of the respective displays is visible to a user seated in a driver's seat via the reflective mirror.

In the aforementioned technology, the plural displays are disposed side-by-side in a vehicle width direction. A meter image (meter video image) is displayed at a display positioned directly in front of the driver's seat. Content (camera video images) for electronic mirrors is displayed at displays positioned at left and right ends.

However, in the displaying described in Japanese Patent Application Laid-Open (JP-A) No. 2023-034812, since the plural displays are disposed substantially flush and side-by-side in the vehicle width direction, it is difficult for a user to instantaneously distinguish between the meter video image and the camera video images, and there is room for improvement.

SUMMARY

The present disclosure provides a vehicle that enables a user seated in a driver's seat to instantaneously distinguish between a meter video image and a camera video image.

A vehicle according to a first aspect includes: a meter display device that displays a meter video image at a front side of a vehicle cabin and at a vehicle front side of a driver's seat; and a camera display device that displays a camera video image capturing a peripheral field of view of the vehicle, at a position peripheral to the meter video image as viewed from the driver's seat and at a position that is offset toward a vehicle front side or a vehicle rear side with respect to the meter video image.

According to the vehicle of the first aspect, the meter video image is displayed at the front side of the vehicle cabin and at the vehicle front side of the driver's seat by the meter display device. Further, the camera video image capturing the peripheral field of view of the vehicle is displayed at a position peripheral to the meter video image as viewed from the driver's seat, by the camera display device.

In this regard, the camera video image is displayed at a position that is offset toward the vehicle front side or the vehicle rear side with respect to the meter video image. Thus, the respective video images can be easily distinguished due to a difference in depth, even if the meter video image and the camera video image are displayed side-byside as viewed from the driver's seat. However, it should be noted that "displaying a video image" as used herein refers to a concept that broadly includes both directly displaying a video image at a display face that is visually recognized by a user seated in the driver's seat, and forming a video image as a virtual image.

A vehicle according to a second aspect is the vehicle according to the first aspect, wherein: an upper end of the camera video image is positioned at a height that is higher than or even with a height of a center of the meter video image in a vehicle up-down direction; and a lower end of the camera video image is positioned at a height that is lower than or even with the height of the center of the meter video image in the vehicle up-down direction.

According to the vehicle of the second aspect, the camera video image is displayed at a position that is substantially side-by-side with the meter video image in a horizontal direction. Consequently, a user seated in the driver's seat can check the meter video image and the camera video image with minimum line-of-sight movement in the horizontal direction.

A vehicle according to a third aspect is the vehicle according to the first aspect, wherein: the camera display device includes a driver's seat side side mirror display device that displays a driver's seat side electronic side mirror video image capturing a driver's seat side rear side of the vehicle, a passenger seat side side mirror display device that displays a passenger seat side electronic side mirror video image capturing a passenger seat side rear side of the vehicle, and a rearview mirror display device that displays an electronic rearview mirror video image capturing directly behind the vehicle; and displays that are visually recognized by a user seated in the driver's seat are arranged in an order of the driver's seat side electronic side mirror video image, the meter video image, the electronic rearview mirror video image, and the passenger seat side electronic side mirror video image, from a driver's seat side toward a passenger seat side.

According to the vehicle of the third aspect, the driver's seat side electronic side mirror video image capturing the driver's seat side rear side of the vehicle is displayed by the driver's seat side side mirror display device. Further, the passenger seat side electronic side mirror video image capturing the passenger seat side rear side of the vehicle is displayed by the passenger seat side side mirror display device. Moreover, the electronic rearview mirror video image capturing directly behind the vehicle is displayed by the rearview mirror display device. Consequently, the user can broadly visually confirm the rear side of the vehicle while keeping his/her line of sight directed toward the vehicle front side.

Further, the displays that are visually confirmed by the user are arranged in the order of the driver's seat side electronic side mirror video image, the meter video image, the electronic rearview mirror video image, and the passenger seat side electronic side mirror video image, from the driver's seat side toward the passenger seat side. Since this arrangement is in the same order as a side mirror at a driver's seat side, a meter, a rearview mirror (room mirror), and a side mirror at a passenger seat side in a conventional vehicle, the user can perceive the respective displays without a sense of incongruity.

A vehicle according to a fourth aspect is the vehicle according to the third aspect, wherein the electronic rearview mirror video image that is visually recognized by the user is positioned further toward the vehicle rear side than the meter video image and further toward the vehicle front side than the passenger seat side electronic side mirror video image.

According to the vehicle of the fourth aspect, the meter video image, the electronic rearview mirror video image, and the passenger seat side electronic side mirror video image are displayed in this order side-by-side in a stepwise manner from the vehicle front side toward the vehicle rear side, and from the driver's seat side toward the passenger seat side, as viewed from the user. Thus, distinguishing between the meter video image and the electronic rearview mirror video image, and distinguishing between the electronic rearview mirror video image and the passenger seat side electronic side mirror video image, can be made easy.

A vehicle according to a fifth aspect is the vehicle according to the first aspect, wherein: the meter display device includes a meter video image light emitting portion that emits light that shows the meter video image, and at least one meter video image reflecting face that reflects light of the meter video image that has been emitted from the meter video image light emitting portion, the meter display device displaying the meter video image by forming a meter virtual image further toward the vehicle front side than a meter video image reflecting face that reflects the light of the meter video image last; and the camera display device includes a camera video image light emitting portion that emits light that shows the camera video image, and includes at least one camera video image reflecting face that reflects light that has been emitted from the camera video image light emitting portion, the camera display device displaying the camera video image by forming a camera virtual image further toward the vehicle front side than a camera video image reflecting face that reflects the light of the camera video image last, and at a position that is offset toward the vehicle front side or the vehicle rear side with respect to the meter virtual image.

According to the vehicle of the fifth aspect, the light of the meter video image that has been emitted from the meter video image light emitting portion is reflected at the at least one meter video image reflecting face. Then, the meter virtual image is formed further toward the vehicle front side than the meter video image reflecting face that reflects the light of the meter video image last, whereby the meter video image is displayed.

Further, the light of the camera video image that has been emitted from the camera video image light emitting portion is reflected at the at least one camera video image reflecting face. Then, the camera virtual image is formed further toward the vehicle front than the camera video image reflecting face that reflects the light of the camera video image last, and at a position that is offset toward the vehicle front side or the vehicle rear side with respect to the meter virtual image, whereby the camera video image is displayed.

Thus, the meter display device and the camera display device can be disposed toward the vehicle rear side, as compared with a case in which a display that is directly visually recognized by the user is disposed at a lower side of a hood or a cowl, and therefore, a degree of freedom of design within a power unit chamber is improved. However, it should be noted that "emitting light" as used herein refers to a concept that broadly includes directly displaying a video image, such as with a display, and emitting light that shows a video image, such as with a projector.

The vehicle according to the first aspect has an effect in that a user seated in the driver's seat can instantaneously distinguish between the meter video image and the camera video image.

The vehicle according to the second aspect has an effect in that a burden of line-of-sight movement of the user can be reduced.

The vehicle according to the third aspect has an effect in that the user can perceive the respective displays without a sense of incongruity.

The vehicle according to the fourth aspect has an effect in that the user can easily distinguish between the meter video image and the electronic rearview mirror video image, and can easily distinguish between the electronic rearview mirror video image and the passenger seat side electronic side mirror video image.

The vehicle according to the fifth aspect has an effect in that a degree of freedom of design within a power unit chamber can be improved.

BRIEF DESCRIPTION OF THE DRAWINGS

Exemplary embodiments of the present disclosure will be described in detail based on the following figures, wherein.

DETAILED DESCRIPTION

A vehicle 10 according to an exemplary embodiment of the present disclosure will be explained below, with reference to FIGS. 1 to 4. It should be noted that, in each of the drawings as appropriate, arrow FR, arrow UP, and arrow LH respectively indicate a front side, an upper side, and a left-right direction (width direction) left side of the vehicle 10. Further, unless specifically stated otherwise, in the following explanation, in cases in which front-rear, up-down, and left-right directions are used, these respectively indicate front and rear in a vehicle front-rear direction, up and down in a vehicle up-down direction, and left and right in a vehicle left-right direction (width direction).

Overall Configuration of Vehicle

Figure 1:
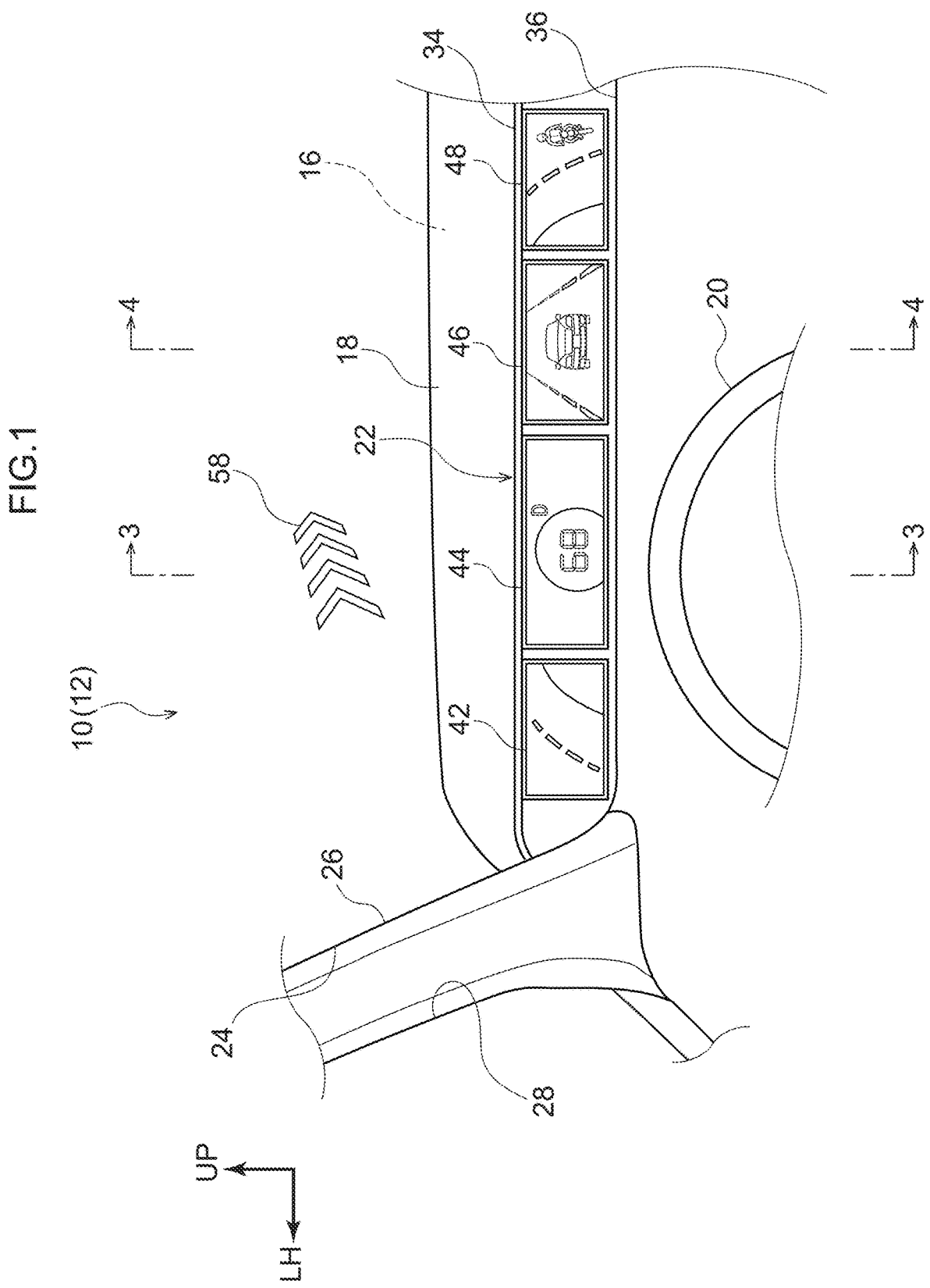
FIG. 1 is a schematic view of a front portion within a vehicle cabin of a vehicle according to the present exemplary embodiment, viewed from a vehicle rear side.

FIG. 1 shows a schematic diagram of a front portion within a vehicle cabin 12 of the vehicle 10 according to the present exemplary embodiment, viewed from a vehicle rear side. As an example, the vehicle 10 is configured as a battery electric vehicle (BEV), includes a battery module at a lower side of a floor 14 (refer to FIG. 3), and includes a motor (not illustrated in the drawings) at a power unit chamber 16 provided at a front side of the vehicle cabin 12. The power unit chamber 16 is covered from a vehicle upper side by a hood 18. It should be noted that the vehicle is not limited to a BEV, and may be a gasoline vehicle or a hybrid vehicle.

As an example, the vehicle 10 is configured as a left-hand drive vehicle in which a steering wheel 20 is provided at a left side. The steering wheel 20 is attached at a vehicle rear side of an instrument panel 22) extending substantially in a vehicle width direction at the front portion of the vehicle cabin 12, and at a vehicle front side of a driver's seat. It should be noted that the driver's seat may be provided at a right side of the vehicle.

A windshield glass 24 is disposed at a vehicle upper side of the instrument panel 22. The windshield glass 24 is inclined at a downward slope toward the vehicle front side, and partitions an interior and an exterior of the vehicle cabin 12.

A left side end portion of the windshield glass 24 is fixed to a front pillar 26 extending in the vehicle up-down direction. Similarly, a right side end portion of the windshield glass 24 is fixed to a front pillar (not illustrated in the drawings) at the vehicle right side. A front door 28 at the vehicle left side is disposed at a vehicle rear side of the front pillar 26.

Figure 3:
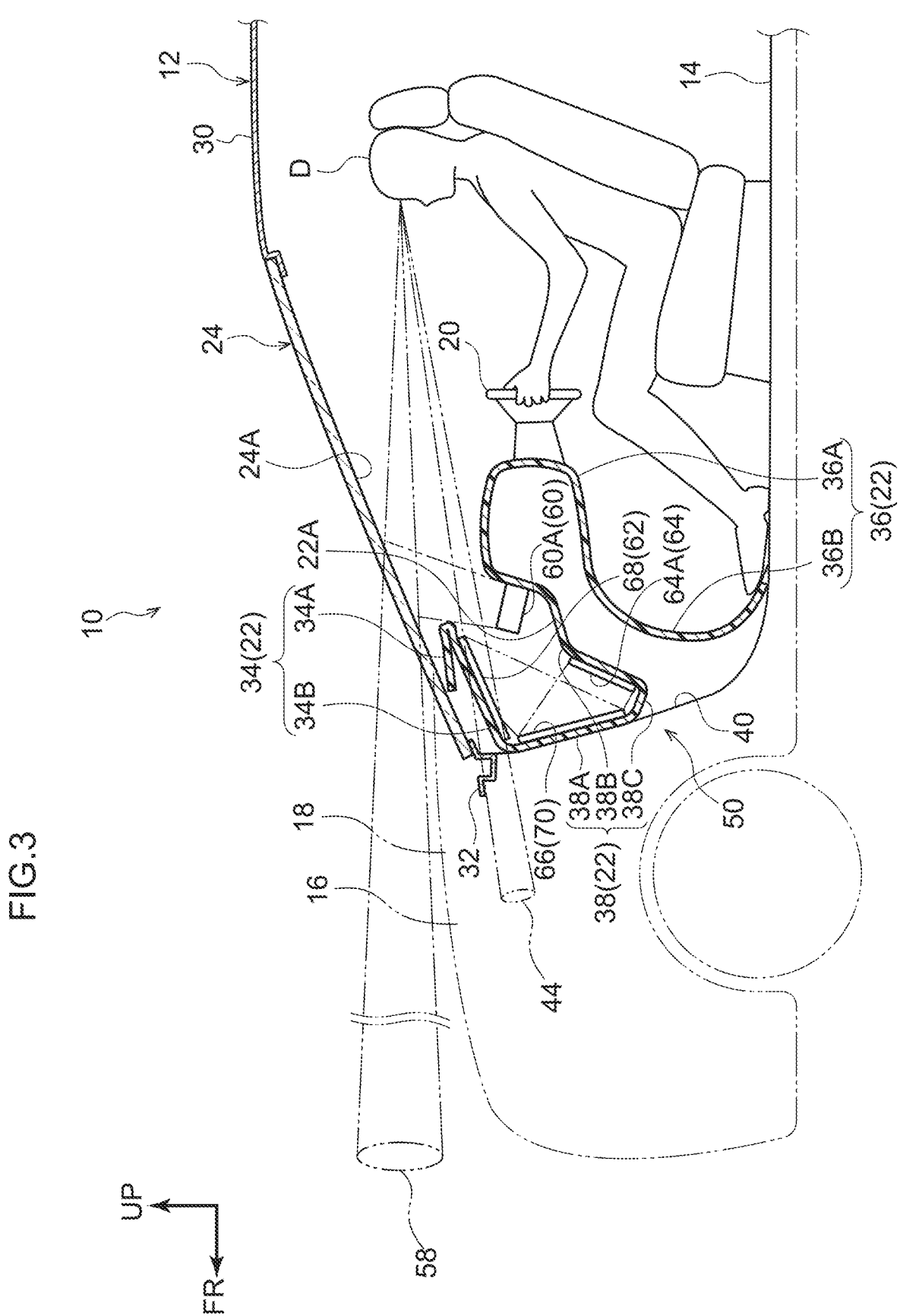
FIG. 3 is a schematic cross-sectional view of a cross-section taken along line 3-3 in FIG. 1, viewed from a vehicle left side.

As illustrated in FIG. 3, an upper end portion of the windshield glass 24 is supported by a front end portion of a roof 30 configuring a ceiling portion of the vehicle cabin 12. A cowl 32 that extends substantially in the vehicle width direction and is formed substantially in a hat shape in a side cross-sectional view is disposed at a lower side of a rear end portion of the hood 18. The cowl 32 spans between the front pillar 26 (refer to FIG. 1) at the vehicle left side and the front pillar (not illustrated in the drawings) at the vehicle right side. A lower end portion of the windshield glass 24 is supported by a flange at a vehicle rear side of the cowl 32.

Instrument Panel

The instrument panel 22 is configured as a panel structure formed of a resin material. The instrument panel 22 is configured to include an upper portion panel 34 provided at a vehicle front side upper portion thereof, a main panel 36 provided at a vehicle rear side thereof, and a concave portion 38 provided between the upper portion panel 34 and the main panel 36 and formed so as to be concave toward the vehicle lower side in a side cross-sectional view.

The upper portion panel 34 is formed substantially in a V-shape that is convex toward the vehicle rear side in a side cross-sectional view. An upper plate portion 34A formed at an upper portion of the upper portion panel 34 extends substantially in a horizontal direction. On the other hand, a lower plate portion 34B formed at a lower portion of the upper portion panel 34 is inclined at a downward slope toward the vehicle front side so as to be substantially parallel to the windshield glass 24.

Further, the main panel 36 is configured to include a rear portion upper side panel 36A that bulges substantially toward the vehicle rear side in a side cross-sectional view, and a rear portion lower side panel 36B that extends substantially in the vehicle up-down direction at a lower side of the rear portion upper side panel 36A. The rear portion upper side panel 36A configures a design face at the front portion of the vehicle cabin 12. The steering wheel 20 (refer to FIG. 1) is provided at the rear portion upper side panel 36A of the instrument panel 22.

Figure 4:
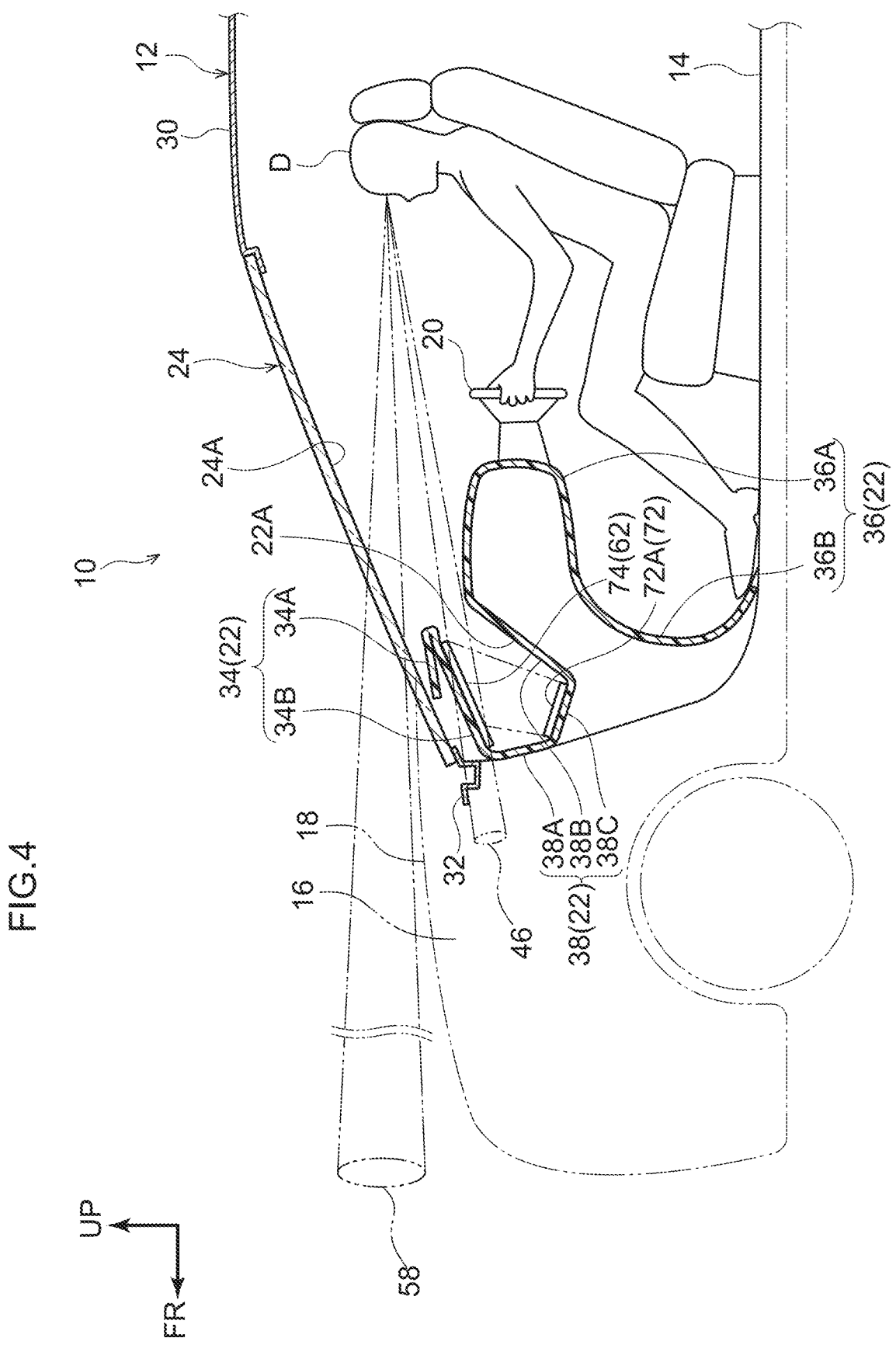
FIG. 4 is a schematic cross-sectional view of a cross-section taken along line 4-4 in FIG. 1, viewed from the vehicle left side.

The concave portion 38 connects a front end portion of the lower plate portion 34B of the upper portion panel 34 and a front end portion of the rear portion upper side panel 36A of the main panel 36, substantially in the vehicle front-rear direction. The concave portion 38 includes a front wall portion 38A provided along a dash panel 40 substantially in the up-down direction, a rear wall portion 38B provided at a vehicle rear side of the front wall portion 38A, and a bottom portion 38C that connects the front wall portion 38A and the rear wall portion 38B and extends substantially in the vehicle front-rear direction. The bottom portion 38C is inclined slightly at a downward slope toward the vehicle rear side. At a position directly in front of a driver D, the rear wall portion 38B is formed in a stepped shape that recedes toward the vehicle front side in a side cross-sectional view. On the other hand, as illustrated in FIG. 4, at positions other than directly in front of the driver D, the rear wall portion 38B is formed in a planar shape that is inclined at a downward slope toward the vehicle front side in a side cross-sectional view.

Various display devices are disposed at an accommodation portion 22A surrounded by the lower plate portion 34B of the upper portion panel 34 of the instrument panel 22 and the concave portion 38. The various display devices will be described in detail later. It should be noted that the shape of the instrument panel 22 described above is one example, and is not limited thereto.

Various Video Images

As illustrated in FIG. 1, at a front side of the driver D (refer to FIG. 3) serving as a user seated in the driver's seat, a driver's seat side electronic side mirror video image 42 (hereafter referred to as a "left side mirror video image 42") serving as a camera video image, a meter video image 44, an electronic rearview mirror video image 46 (hereafter referred to as a "rearview mirror video image 46") serving as a camera video image, and a passenger seat side electronic side mirror video image 48 (hereafter referred to as a "right side mirror video image 48") serving as a camera video image are displayed in order from the vehicle left side. The left side mirror video image 42, the meter video image 44, the rearview mirror video image 46, and the right side mirror video image 48 are visible, viewed from the driver D, at an inner side (vehicle front side) between the lower plate portion 34B of the upper portion panel 34 of the instrument panel 22 (refer to FIG. 3) and the rear portion upper side panel 36A of the main panel 36 (refer to FIG. 3), namely, at a vehicle lower side of the hood 18 at a front side of the vehicle cabin 12.

The meter video image 44 is configured to include vehicle information related to measurement values of various meters installed at the vehicle 10, and, as an example, is configured to include video image content such as a speedometer, a shift position, a warning lamp and the like. The meter video image 44 is displayed by a meter display device 50 (refer to FIGS. 2 and 3), which will be described later. The meter video image 44 is configured so as to be displayed directly in front of the driver D.

The left side mirror video image 42 is a video image capturing a driver's seat side rear side of the vehicle 10. As an example, the left side mirror video image 42 is captured by a left side camera (not illustrated in the drawings) provided at a left side portion of the vehicle 10, and is displayed by a left side mirror display device 52 (refer to FIG. 2), which will be described later, serving as a driver's seat side side mirror display device.

The right side mirror video image 48 is a video image capturing a passenger seat side rear side of the vehicle 10. As an example, the right side mirror video image 48 is captured by a right side camera (not illustrated in the drawings) provided at a right side portion of the vehicle 10, and is displayed by a right side mirror display device 54 (refer to FIG. 2), which will be described later, serving as a passenger seat side side mirror display device.

The rearview mirror video image 46 is a video image capturing directly behind the vehicle 10. As an example, the rearview mirror video image 46 is captured by a rearview camera (not illustrated in the drawings) provided at a rear end portion of the vehicle 10, and is displayed by a rearview mirror display device 56 (refer to FIGS. 2 and 4), which will be described later.

The left side mirror video image 42, the meter video image 44, the rearview mirror video image 46, and the right side mirror video image 48 are displayed side-by-side substantially in the horizontal direction, namely, at substantially the same height, as viewed from the driver D. Further, they are displayed such that depths thereof change stepwise in an order of the meter video image 44, the rearview mirror video image 46, and the right side mirror video image 48, from the vehicle front side toward the vehicle rear side, as viewed from the driver D. The left side mirror video image 42 is displayed at substantially the same depth as the right side mirror video image 48, as viewed from the driver D. Namely, among the four video images, the meter video image 44 is displayed farthest, as viewed from the driver D, and the left side mirror video image 42 and the right side mirror video image 48 are displayed nearest, as viewed from the driver D (refer to FIG. 2).

Further, a travel-related video image 58 including travel-related information of the vehicle 10 is projected onto the windshield glass 24. The travel-related video image 58 is configured to include, as an example, navigation of a travel route, an obstacle on a road, road information, and the like. The travel-related video image 58 is projected onto the windshield glass 24 by a head-up display (HUD) device 60 (refer to FIG. 3), which will be described later, and is displayed so as to be superimposed on scenery in front of the vehicle 10 that the driver D sees through the windshield glass 24.

Various Display Devices

Figure 2:
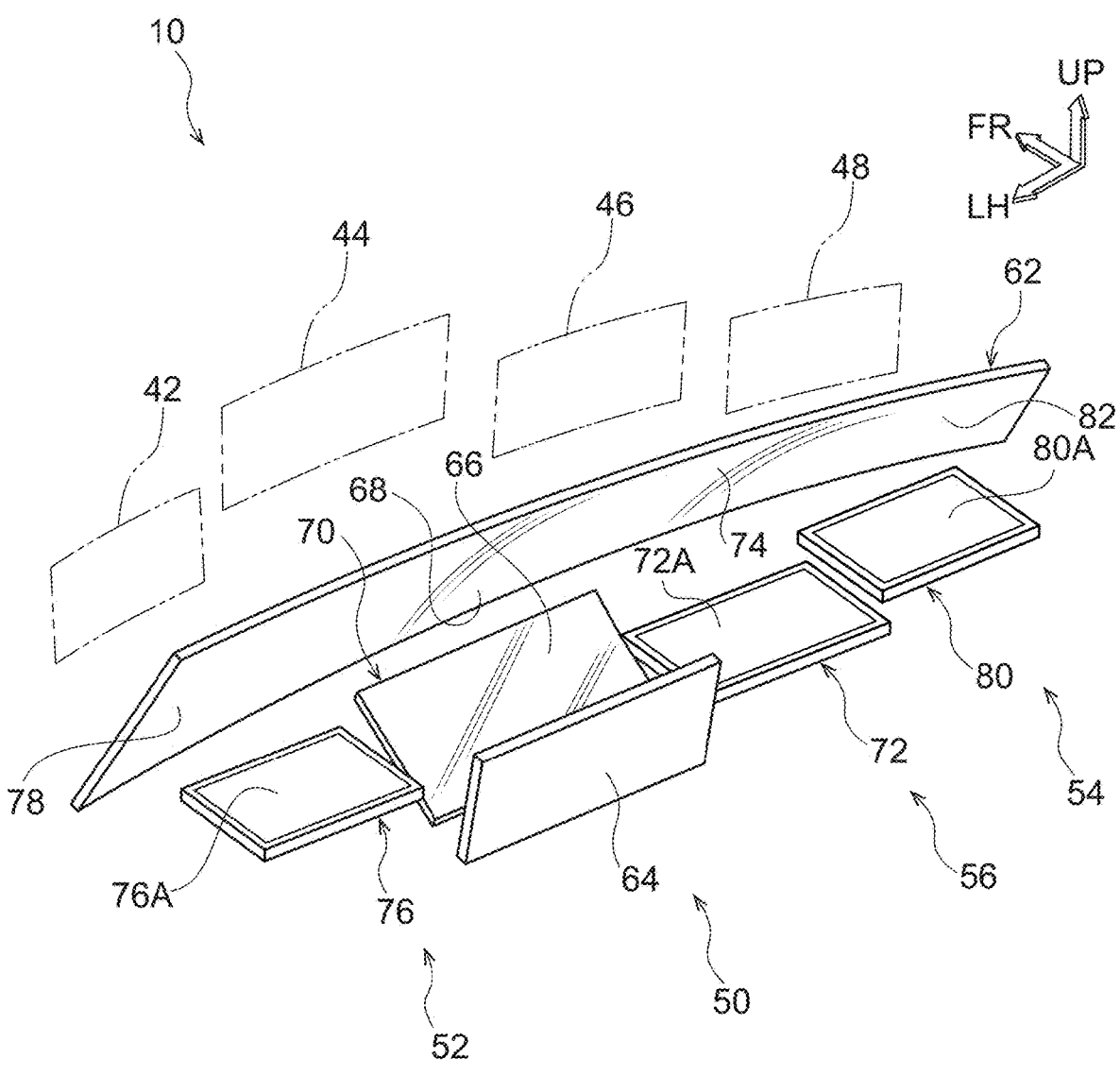
FIG. 2 is a rear perspective view of respective display devices displaying video images illustrated in FIG. 1, viewed from a vehicle left and rear oblique upper side.

FIG. 2 shows a meter display device 50 that displays the meter video image 44, a left side mirror display device 52 that displays the left side mirror video image 42, a right side mirror display device 54 that displays the right side mirror video image 48, and a rearview mirror display device 56 that displays the rearview mirror video image 46. The meter video image 44, the left side mirror video image 42, the right side mirror video image 48, and the rearview mirror video image 46 are displayed as virtual images at a vehicle front side of a visual recognition mirror 62 that is visually recognized by the driver D. The visual recognition mirror 62 is formed in a substantially rectangular plate shape having a longitudinal direction along the vehicle width direction, and is a concave mirror that is concave substantially toward the vehicle front side. As illustrated in FIG. 3, the visual recognition mirror 62 is attached to a face at a vehicle lower side of the lower plate portion 34B of the upper portion panel 34 of the instrument panel 22, and a reflecting face faces toward the vehicle lower side and the vehicle rear side.

Meter Display Device

As illustrated in FIGS. 2 and 3, the meter display device 50 is configured to include a meter display 64 serving as a meter video image light emitting portion that displays the meter video image 44, a first meter video image reflecting face 66 that reflects light of the meter video image 44 that has been displayed at the meter display 64, and a second meter video image reflecting face 68 that reflects light of the meter video image 44 that has been reflected by the first meter video image reflecting face 66, substantially toward the vehicle rear side.

As an example, the meter display 64 displays the meter video image 44 according to a signal sent from an electronic control unit (ECU, not illustrated in the drawings) electrically connected to the various meters (not illustrated in the drawings). As illustrated in FIG. 3, the meter display 64 is attached to a lower portion front face of the rear wall portion 38B of the concave portion 38 of the instrument panel 22. The meter display 64 is disposed so as to be inclined such that a display face 64A faces toward the vehicle front side and the vehicle upper side, and is disposed directly in front of the driver D.

Further, as illustrated in FIG. 2, the first meter video image reflecting face 66 is positioned at a face at a vehicle rear side of a meter mirror 70 formed in a substantially rectangular plate shape. A dimension of the meter mirror 70 in the vehicle width direction is configured to be substantially the same as a dimension of the meter display 64 in the vehicle width direction. As illustrated in FIG. 3, the meter mirror 70 is attached to a face at a vehicle rear side of the front wall portion 38A of the concave portion 38 of the instrument panel 22. The meter mirror 70 is disposed so as to be inclined such that the first meter video image reflecting face 66 faces toward the vehicle rear side and the vehicle upper side.

Moreover, as illustrated in FIG. 2, the second meter video image reflecting face 68 is a portion of a face at a vehicle rear side of the visual recognition mirror 62. As illustrated in FIG. 3, the visual recognition mirror 62 is attached to a face at a vehicle lower side of the lower plate portion 34B of the upper portion panel 34 of the instrument panel 22. The visual recognition mirror 62 is disposed at a position that is visible to the driver D seated in the driver's seat. The visual recognition mirror 62 forms the meter video image 44, serving as a meter virtual image, further toward the vehicle front side than the visual recognition mirror 62. Consequently, as illustrated in FIG. 1, a configuration is provided such that the meter video image 44 is displayed at a vehicle lower side of the hood 18, and is visually recognized by the driver.

Rearview Mirror Display Device

As illustrated in FIG. 2 and FIG. 4, the rearview mirror display device 56 is configured to include a rearview mirror display 72 (hereafter referred to as a "rearview display 72")

serving as a camera video image light emitting portion that displays the rearview mirror video image 46, and a rearview mirror video image reflecting face 74 serving as a camera video image reflecting face that reflects light of the rearview mirror video image 46 that has been displayed at the rearview display 72, substantially toward the vehicle rear side.

As an example, the rearview display 72 displays the rearview mirror video image 46 according to a signal sent from the rearview camera (not illustrated in the drawings). The rearview display 72 is disposed further toward the right side than the meter display 64. As illustrated in FIG. 4, the rearview display 72 is attached to a face at a vehicle upper side of the bottom portion 38C of the concave portion 38 of the instrument panel 22. The rearview display 72 is disposed so as to be inclined rearward such that a display face 72A faces toward the vehicle upper side and slightly toward the vehicle rear side.

Further, as illustrated in FIG. 2, the rearview mirror video image reflecting face 74 is positioned at a vehicle right side of the second meter video image reflecting face 68, at the face at the vehicle rear side of the visual recognition mirror 62. The visual recognition mirror 62 forms the rearview mirror video image 46, serving as a camera virtual image, further toward the vehicle front side than the visual recognition mirror 62, at a right side of the meter video image 44 as viewed from the driver D, and at a position that is offset toward the vehicle rear side with respect to the meter video image 44. Consequently, as illustrated in FIG. 1, a configuration is provided such that the rearview mirror video image 46 is displayed at the vehicle lower side of the hood 18, and is visually recognized by the driver.

Left Side Mirror Display Device

As illustrated in FIG. 2, the left side mirror display device 52 is configured to include a driver' seat side side mirror display 76 (hereafter referred to as a "left side display 76") serving as a camera video image light emitting portion that displays the left side mirror video image 42, and a left side mirror video image reflecting face 78 serving as a camera video image reflecting face that reflects light of the left side mirror video image 42 that has been displayed at the left side display 76, substantially toward the vehicle rear side.

As an example, the left side display 76 displays the left side mirror video image 42 according to a signal sent from the left side camera (not illustrated in the drawings). The left side display 76 is disposed further toward the vehicle left side than the meter display 64. Similarly to the rearview display 72, the left side display 76 is attached to the face at the vehicle upper side of the bottom portion 38C (refer to FIG. 4) of the concave portion 38 of the instrument panel 22. The left side display 76 is disposed so as to be inclined rearward such that a display face 76A faces substantially toward the vehicle upper side and slightly toward the vehicle rear side.

Further, the left side mirror video image reflecting face 78 is positioned at a vehicle left side of the second meter video image reflecting face 68 at the face at the vehicle rear side of the visual recognition mirror 62. The visual recognition mirror 62 forms the left side mirror video image 42, serving as a camera virtual image, further toward the vehicle front side than the visual recognition mirror 62, at a left side of the meter video image 44 as viewed from the driver D, and further toward the vehicle rear side than the rearview mirror video image 46. Consequently, as illustrated in FIG. 1, a configuration is provided such that the left side mirror video image 42 is displayed at the vehicle lower side of the hood 18, and is visually recognized by the driver.

Right Side Mirror Display Device

As illustrated in FIG. 2, in a similar manner to the left side mirror display device 52, the right side mirror display device 54 is configured to include a passenger seat side side mirror display 80 (hereafter referred to as a "right side display 80") serving as a camera video image light emitting portion that displays the right side mirror video image 48, and a right side mirror video image reflecting face 82 serving as a camera video image reflecting face that reflects light of the right side mirror video image 48 that has been displayed at the right side display 80, substantially toward the vehicle rear side.

As an example, the right side display 80 displays the right side mirror video image 48 according to a signal sent from the right side camera (not illustrated in the drawings). The right side display 80 is disposed further toward the vehicle right side than the rearview display 72. Similarly to the rearview display 72 and the left side display 76, the right side display 80 is attached to the face at the vehicle upper side of the bottom portion 38C (refer to FIG. 4) of the concave portion 38 of the instrument panel 22. The right side display 80 is disposed so as to be inclined rearward such that a display face 80A faces substantially toward the vehicle upper side and slightly toward the vehicle rear side.

Further, the right side mirror video image reflecting face 82 is positioned at a vehicle right side of the rearview mirror video image reflecting face 74 at the face at the vehicle rear side of the visual recognition mirror 62. The visual recognition mirror 62 forms the right side mirror video image 48, serving as a camera virtual image, further toward the vehicle front side than the visual recognition mirror 62, at a vehicle right side of the rearview mirror video image 46 as viewed from the driver D, and at substantially the same position as the left side mirror virtual image in a side view, namely, further toward the vehicle rear side than the rearview mirror video image 46. Consequently, as illustrated in FIG. 1, the right side mirror video image 48 is displayed at the vehicle lower side of the hood 18, and is visually recognized by the driver.

The meter display 64, the rearview display 72, the left side display 76, and the right side display 80 are all disposed further toward the vehicle lower side than the visual recognition mirror 62. Each of the meter display 64, the rearview display 72, the left side display 76, and the right side display 80 is, by way of example, a light-emitting diode (LED) display, but is not limited thereto, and each of these may be, for example, an organic electro-luminescence (EL) display.

HUD Device

As illustrated in FIG. 3, the HUD device 60 is attached to an upper portion front face of the rear wall portion 38B of the concave portion 38 of the instrument panel 22, directly in front of the driver's seat. As an example, the HUD device 60 includes a case body 60A that is open at the vehicle upper side, and a HUD light source (not illustrated in the drawings) that is installed at an interior of the case body 60A and that is electrically connected to an ECU (not illustrated in the drawings) and projects the travel-related video image 58 onto the windshield glass 24.

A face at a vehicle cabin 12 inner side of the windshield glass 24 is configured as a reflecting face 24A that reflects light of the travel-related video image 58 that has been projected from the HUD device 60, to a position at which it can be visually recognized by the driver D. The driver D can visually recognize the light reflected by the reflecting face 24A, as the travel-related video image 58. The travel-related video image 58 is displayed in a manner so as to be superimposed on a landscape in a real space in front of the vehicle, that the driver D visually recognizes through the windshield glass 24. Since the travel-related video image 58 is formed at a position further toward the vehicle front side than the reflecting face 24A, a configuration is provided in which the driver D visually recognizes the travel-related video image 58 at a position further toward the vehicle front side than the windshield glass 24. It should be noted that it is not necessary for the vehicle to include the HUD device 60 that projects the travel-related video image 58 onto the windshield glass 24.

The meter display 64, the meter mirror 70, the rearview display 72 (refer to FIG. 4), the left side display 76 (refer to FIG. 2), the right side display 80 (refer to FIG. 2), and the HUD device 60 are all disposed at positions that are not visible to the driver D seated in the driver's seat.

Operation

Next, operation of the present exemplary embodiment will be explained.

As illustrated in FIG. 3, in the vehicle 10 according to the present exemplary embodiment, the meter video image 44 is displayed at the front side of the vehicle cabin 12 and at the vehicle front side of the driver's seat, by the meter display device 50. Further, as illustrated in FIG. 1, the left side mirror video image 42 is displayed next to, and at the left of, the meter video image 44 as viewed from the driver's seat, by the left side mirror display device 52 (refer to FIG. 2). Furthermore, the rearview mirror video image 46 is displayed next to, and at the right of, the meter video image 44 as viewed from the driver's seat, by the rearview mirror display device 56 (refer to FIG. 2). Moreover, the right side mirror video image 48 is displayed next to, and at the right of, the rearview mirror video image 46 as viewed from the driver's seat, by the right side mirror display device 54 (refer to FIG. 2).

In this regard, as illustrated in FIG. 2, the rearview mirror video image 46, the left side mirror video image 42, and the right side mirror video image 48 are each displayed at positions that are offset toward the vehicle rear side with respect to the meter video image 44. Thus, even if the left side mirror video image 42, the meter video image 44, the rearview mirror video image 46, and the right side mirror video image 48 are displayed side-by-side as viewed from the driver's seat, the driver D can easily distinguish between the meter video image 44 and the other video images (the rearview mirror video image 46, the left side mirror video image 42, and the right side mirror video image 48) due to differences in depth.

Further, in the vehicle 10 according to the present exemplary embodiment, the left side mirror video image 42, the meter video image 44, the rearview mirror video image 46, and the right side mirror video image 48 are disposed at substantially the same height as viewed from the vehicle rear side. Consequently, the driver D can check the left side mirror video image 42, the meter video image 44, the rearview mirror video image 46, and the right side mirror video image 48 with minimum line-of-sight movement in the horizontal direction. Thus, a burden of line-of-sight movement of the driver D can be reduced.

Moreover, in the vehicle 10 according to the present exemplary embodiment, the driver D can see the left side mirror video image 42 showing the left rear side of the vehicle 10, the right side mirror video image 48 showing the right rear side of the vehicle 10, and the rearview mirror video image 46 showing directly behind the vehicle 10, while keeping his/her line of sight directed toward the vehicle front side. Thus, the driver D can broadly visually confirm the rear side of the vehicle 10 while keeping his/her line of sight directed toward the vehicle front side.

Furthermore, the left side mirror video image 42, the meter video image 44, the rearview mirror video image 46, and the right side mirror video image 48 are displayed side-by-side in this order from the vehicle left side toward the right side. Since this arrangement is in the same order as a left side side mirror, a meter, a rearview mirror (room mirror), and a right side side mirror of a conventional vehicle, the driver D can perceive the respective displays without a sense of incongruity.

Further, in the vehicle 10 according to the present exemplary embodiment, the meter video image 44, the rearview mirror video image 46, and the right side mirror video image 48 are displayed in order at stepwise depths from the vehicle front side toward the vehicle rear side as viewed from the driver D. Thus, distinguishing between the meter video image 44 and the rearview mirror video image 46, and distinguishing between the rearview mirror video image 46 and the right side mirror video image 48, can be made easier.

Moreover, as illustrated in FIG. 3, in the vehicle 10 according to the present exemplary embodiment, light of the meter video image 44 emitted from the meter display 64 is reflected by the first meter video image reflecting face 66 and the second meter video image reflecting face 68. Then, a virtual image is formed further toward the vehicle front side than the second meter video image reflecting face 68 that reflects the light of the meter video image 44 last, whereby the meter video image 44 is displayed.

Further, as illustrated in FIG. 4, light of the rearview mirror video image 46 emitted from the rearview display 72 is reflected by the rearview mirror video image reflecting face 74. Then, a virtual image is formed further toward the vehicle front side than the rearview mirror video image reflecting face at a position that is offset toward the vehicle rear side with respect to the meter video image 44, whereby the rearview mirror video image 46 is displayed.

Similarly, light of the left side mirror video image 42 emitted from the left side display 76 is reflected by the left side mirror video image reflecting face 78, and a virtual image is formed, whereby the left side mirror video image 42 is displayed. Similarly, light of the right side mirror video image 48 emitted from the right side display 80 is reflected by the right side mirror video image reflecting face 82, and a virtual image is formed, whereby the right side mirror video image 48 is displayed.

Thus, the meter display device 50, the rearview mirror display device 56, the left side mirror display device 52, and the right side mirror display device 54 can be disposed toward the vehicle rear side, as compared with a case in which a display that is directly visually recognized by the driver D is disposed at a lower side of a hood or a cowl, and therefore, a degree of freedom of design within the power unit chamber 16 is improved.

Furthermore, in the vehicle 10 according to the present exemplary embodiment, the meter display device 50, the rearview mirror display device 56, the left side mirror display device 52, and the right side mirror display device 54 are all accommodated in the accommodation portion 22A at a lower side of the upper portion panel 34 of the instrument panel 22. Thus, the meter display device 50, the rearview mirror display device 56, the left side mirror display device 52, and the right side mirror display device 54 are unlikely to be affected by light from an exterior of the vehicle 10, such as sunlight or the like. Consequently, visibility of the meter video image 44, the rearview mirror video image 46, the left side mirror video image 42, and the right side mirror video image 48 is improved.

In particular, the visual recognition mirror 62 that is directly viewed by the driver D is attached to the face at the vehicle lower side of the lower plate portion 34B of the upper portion panel 34. Thus, visibility of the meter video image 44, the rearview mirror video image 46, the left side mirror video image 42, and the right side mirror video image 48 that are shown at the visual recognition mirror 62 is even further improved.

Further, in the vehicle 10 according to the present exemplary embodiment, the travel-related video image 58 is displayed by the HUD device 60 so as to be superimposed on the scenery in front of the vehicle 10 that the driver D sees through the windshield glass 24. Thus, the driver D can visually recognize the travel-related video image 58 without substantially moving his/her line of sight from the scenery in front of the vehicle 10. In this regard, the meter video image 44, the rearview mirror video image 46, the left side mirror video image 42, and the right side mirror video image 48 are displayed at the lower side of the hood 18, namely, at a position that is separated from the driver's seat toward the vehicle front side. Thus, a difference in focal length between the scenery in front of the vehicle 10 or the travel-related video image 58, and the respective displays, is reduced, compared to a meter, a rearview mirror (room mirror), and left and right side mirrors in a conventional vehicle. Consequently, a distance and an adjustment time of focal movement for moving a line of sight from the scenery in front of the vehicle 10 or the travel-related video image 58 to visually recognize each of the meter video image 44, the rearview mirror video image 46, the left side mirror video image 42, and the right side mirror video image 48, can be short. Thus, the burden of line-of-sight movement of the driver D is even further reduced.

Moreover, as illustrated in FIG. 2, in the vehicle 10 according to the present exemplary embodiment, the second meter video image reflecting face 68, the rearview mirror video image reflecting face 74, the left side mirror video image reflecting face 78, and the right side mirror video image reflecting face 82 are all positioned at the face at the vehicle rear side of the visual recognition mirror 62, which is a single concave mirror. Thus, the meter video image 44, the rearview mirror video image 46, the left side mirror video image 42, and the right side mirror video image 48 can be displayed with a simpler configuration than in cases in which the meter display device, the rearview mirror display device, the left side mirror display device, and the right side mirror display device each include different reflecting mirrors. Further, since the visual recognition mirror 62 is disposed at a position that is visible from the interior of the vehicle cabin 12, by configuring the visual recognition mirror 62 as a single concave mirror, design characteristics when the various video images are not being displayed can be improved.

Supplementary Explanation of the Above Exemplary Embodiment

In the above exemplary embodiment, it has been explained that the rearview mirror video image 46, the left side mirror video image 42, and the right side mirror video image 48 are each displayed at positions that are offset toward the vehicle rear side with respect to the meter video image 44, but there is no limitation thereto. For example, the camera video images may be displayed at positions that are offset toward the vehicle front side with respect to the meter video image. Further, the display positions of the meter video image 44 and the rearview mirror video image 46 illustrated in FIGS. 3 and 4 are one example, and are not limited to these positions. For example, the meter video image and the respective camera video images may be displayed at a lower side of the cowl 32.

Further, in the above exemplary embodiment, although it has been explained that the meter video image 44, the rearview mirror video image 46, the left side mirror video image 42, and the right side mirror video image 48 are disposed at substantially the same height as viewed from the vehicle rear side, there is no limitation thereto, and it is sufficient that upper ends of the respective camera video images are positioned at heights that are higher than or even with that of a center of the meter video image in the vehicle up-down direction, and that lower ends of the respective camera video images are positioned at heights that are lower than or even with that of the center of the meter video image in the vehicle up-down direction.

Moreover, in the above exemplary embodiment, it has been explained that the rearview mirror video image 46 is displayed by the rearview mirror display device 56, that the left side mirror video image 42 is displayed by the left side mirror display device 52, and that the right side mirror video image 48 is displayed by the right side mirror display device 54, but the camera video images capturing the peripheral field of view of the vehicle are not limited to electronic mirror video images. For example, the camera video images may be a video image capturing in front of the vehicle, a video image capturing a rear portion of the vehicle, a video image capturing a front side corner portion or a rear side corner portion of the vehicle, or a video image capturing a side portion of the vehicle.

Moreover, in the above exemplary embodiment, it has been explained that the left side mirror video image 42, the meter video image 44, the rearview mirror video image 46, and the right side mirror video image 48 are arranged in this order from the driver's seat side toward the passenger seat side, but the order of arrangement is not limited thereto. Further, the number of camera video images to be displayed is not limited to three, and it is sufficient that there is at least one camera video image.

Furthermore, in the above exemplary embodiment, it has been explained that the meter video image 44 is displayed by the meter display 64, that the rearview mirror video image 46 is displayed by the rearview display 72, that the left side mirror video image 42 is displayed by the left side display 76, and that the right side mirror video image 48 is displayed by the right side display 80, but there is no limitation thereto. For example, the meter video image light emitting portion and the camera video image light emitting portions may each be a projector that emits light showing a video image.

Further, in the above exemplary embodiment, it has been explained that the light of the meter video image 44 displayed at the meter display 64 is reflected twice by the first meter video image reflecting face 66 and the second meter video image reflecting face 68, but the number of times of reflection is not limited thereto. Moreover, although it has been explained that the light of the rearview mirror video image 46 displayed at the rearview display 72, the light of the left side mirror video image 42 displayed at the left side display 76, and the light of the right side mirror video image 48 displayed at the right side display 80 are each reflected once by the visual recognition mirror 62, there is no limitation thereto, and each of these may be reflected plural times. That is to say, the number of times of reflection of light in each of the respective display devices is not limited to that in the above exemplary embodiment. Further, the meter video image and the camera video image are not limited to being reflected by mirrors and may be reflected by other reflective materials. For example, the structure of a vehicle 90 according to a first modified example illustrated in FIG. 5 may be employed.

Moreover, in the above exemplary embodiment, it has been explained that the driver D visually recognizes images that have been formed, but there is no limitation thereto. For example, the structure of a vehicle 100 according to a second modified example illustrated in FIG. 6 may be employed.

Furthermore, in the above exemplary embodiment, it has been explained that the second meter video image reflecting face 68, the rearview mirror video image reflecting face 74, the left side mirror video image reflecting face 78, and the right side mirror video image reflecting face 82 are all positioned at the face at the vehicle rear side of the visual recognition mirror 62, which is a single concave mirror, as illustrated in FIG. 2, but there is no limitation thereto. For example, the structure of a vehicle 110 according to a third modified example illustrated in FIG. 7 may be employed, or the structure of a vehicle 140 according to a fourth modified example illustrated in FIGS. 9 and 10 may be employed.

It should be noted that, in the following modified examples, configurations that are the same as those in the above exemplary embodiment are appended with the same reference numerals, and explanation thereof is appropriately omitted.

First Modified Example

Figure 5:
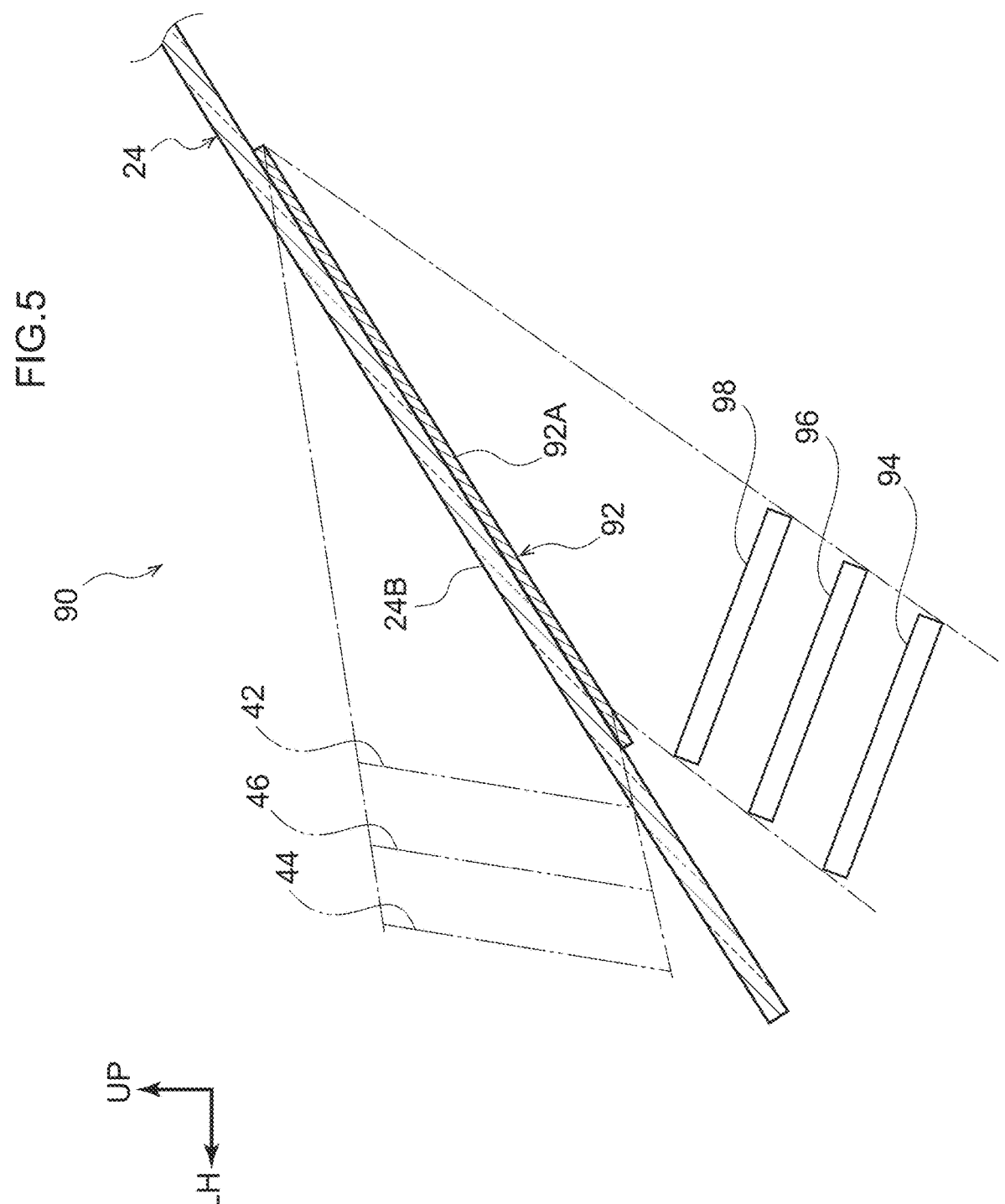
FIG. 5 is an enlarged cross-sectional view of a relevant portion of a cross-section of a vehicle according to a first modified example, viewed from the vehicle left side.

As illustrated in FIG. 5, a reflective film 92, serving as a reflective material, is adhered to a face at a vehicle rear side of a lower end portion 24B of the windshield glass 24 of the vehicle 90. The reflective film 92 is disposed at the lower side of the hood 18 (refer to FIG. 3), and includes a reflecting face 92A at a vehicle rear side thereof. The reflecting face 92A corresponds to the meter video image reflecting face and the camera video image reflecting face of the present disclosure.

A meter display 94 that displays the meter video image 44, a rearview mirror display 96 that displays the rearview mirror video image 46, a driver's seat side side mirror display 98 (hereafter referred to as a "left side display 98") that displays the left side mirror video image 42, and a right side mirror display (not illustrated in the drawings) that displays the right side mirror video image 48 (refer to FIG. 1) are installed at the vehicle 90. The meter display 94 and the reflecting face 92A correspond to the meter display device of the present disclosure, the rearview mirror display 96 and the reflecting face 92A correspond to the rearview mirror display device of the present disclosure, the left side display 98 and the reflecting face 92A correspond to the driver's seat side side mirror display device of the present disclosure, and the right side display (not illustrated in the drawings) and the reflecting face 92A correspond to passenger seat side side mirror display device of the present disclosure.

The meter display 94 is disposed further toward the vehicle lower side and the vehicle front side than the rearview mirror display 96. Further, the left side display 98 and the right side mirror display (not illustrated in the drawings) are disposed further toward the vehicle upper side and the vehicle rear side than the rearview mirror display 96. That is to say, the meter display 94, the rearview mirror display 96, and the left side display 98 are disposed so as to get closer to the reflective film 92 in this order. Although not illustrated in the drawings, opening portions for transmitting respective lights emitted from the meter display 94, the rearview mirror display 96, the left side display 98, and the right side mirror display (not illustrated in the drawings) are formed at an instrument panel of the vehicle 90.

Lights of the respective video images that have been emitted from the meter display 94, the rearview mirror display 96, the left side display 98, and a right side mirror display (not illustrated in the drawings) are each reflected toward the vehicle rear side by the reflective film 92 and reach the driver D. Consequently, the meter video image 44, the rearview mirror video image 46, the left side mirror video image 42, and the right side mirror video image 48 (refer to FIG. 1) are each displayed as a virtual image at the vehicle front side of the windshield glass 24 and at the vehicle lower side of the hood 18 (refer to FIG. 3). Since the arrangement of the meter video image 44, the rearview mirror video image 46, the left side mirror video image 42, and the right side mirror video image 48 is the same as in the above exemplary embodiment, explanation thereof is omitted.

Second Modified Example

Figure 6:
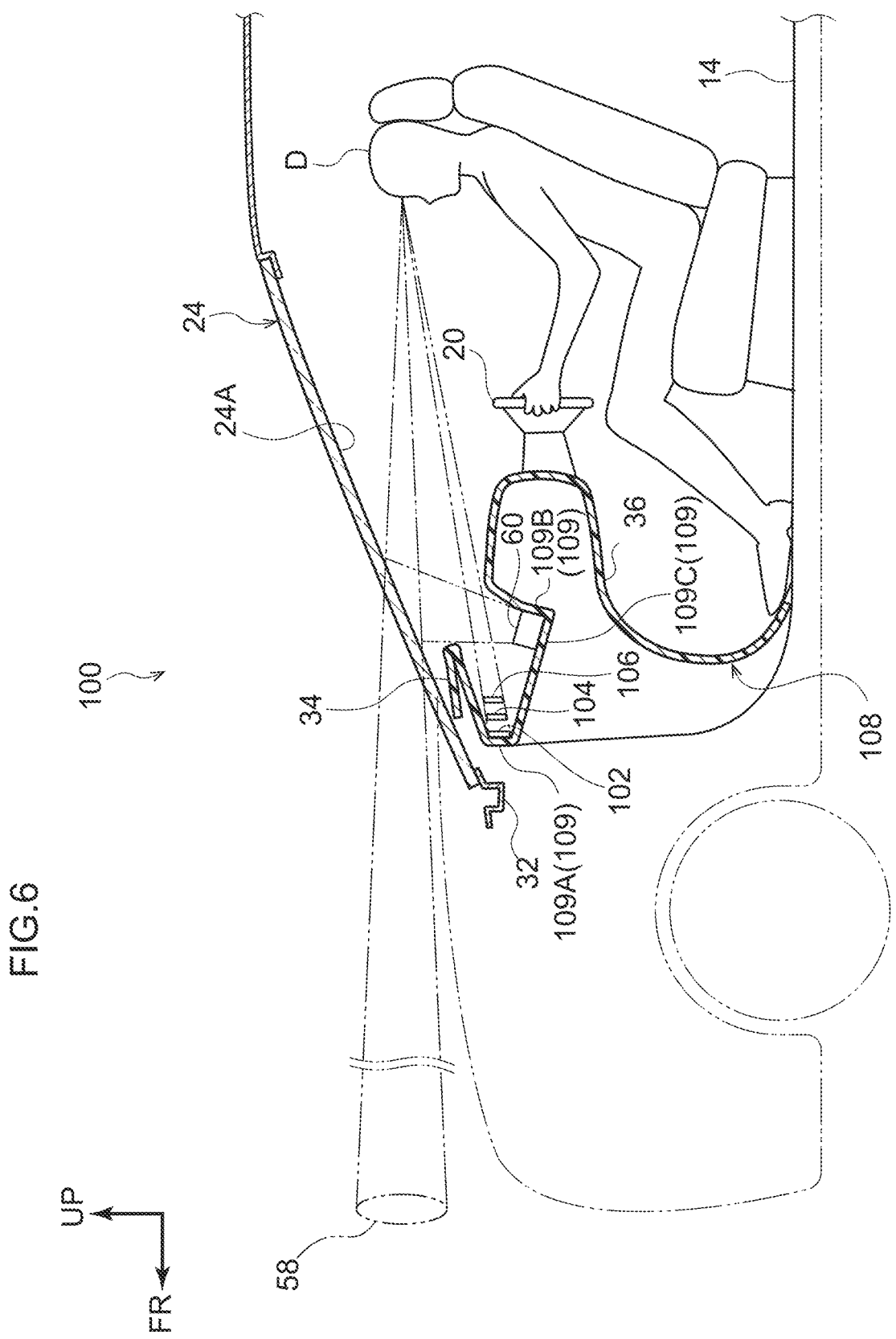
FIG. 6 is a schematic cross-sectional view of a cross-section of a vehicle according to a second modified example, viewed from the vehicle left side.

As illustrated in FIG. 6, the vehicle 100 according to the second modified example includes a meter display 102 serving as a meter display device that directly displays the meter video image 44 (refer to FIG. 1), a rearview display 104 serving as a rearview mirror display device that directly displays the rearview mirror video image 46 (refer to FIG. 1), a left side display 106 serving as a driver's seat side side mirror display device that directly displays the left side mirror video image 42 (refer to FIG. 1), and a right side display (not illustrated in the drawings) serving as a passenger seat side side mirror display device that directly displays the right side mirror video image 48 (refer to FIG. 1).

An instrument panel 108 is configured to include the upper portion panel 34, the main panel 36, and a concave portion 109 that connects the upper portion panel 34 and the main panel 36 substantially in the vehicle front-rear direction. The concave portion 109 is formed so as to be shallower than the concave portion 38 (refer to FIGS. 3 and 4) of the above exemplary embodiment in a side cross-sectional view (namely, a dimension thereof substantially in the vehicle up-down direction is smaller). The concave portion 109 is formed substantially in a U-shape in a side cross-sectional view, and is configured to include a front wall portion 109A, a rear wall portion 109B, and a bottom portion 109C that connects the front wall portion 109A and the rear wall portion 109B.

The HUD device 60 is attached to a corner portion between the bottom portion 109C and the rear wall portion 109B at a position that is not visible to the driver D seated in the driver's seat. The left side display 106, the meter display 102, the rearview display 104, and the right side display (not illustrated in the drawings) are disposed in this order from the driver's seat side toward the passenger seat side, and are each attached to the front wall portion 109A. The rearview display 104 is disposed so as to be offset toward the vehicle rear side with respect to the meter display 102. Further, the left side display 106 and the right side display (not illustrated in the drawings) are disposed so as to be further offset toward the vehicle rear side with respect to the rearview display 104.

In the vehicle 100 according to the present modified example, the meter display 102, the rearview display 104, the left side display 106, and the right side display (not illustrated in the drawings) are disposed at positions that can be directly visually recognized from the driver D seated in the driver's seat. Thus, distinguishing between the meter video image and the camera video images can be made easier, and the burden of line-of-sight movement of the user can be reduced, with an even simpler configuration, compared with a configuration in which light is reflected using a reflective material. Further, since the meter display 102, the rearview display 104, the left side display 106, and the right side display (not illustrated in the drawings) are disposed at a lower side of the lower plate portion 34B of the upper portion panel 34 of the instrument panel 108, the meter video image 44, the rearview mirror video image 46, the left side mirror video image 42, and the right side mirror video image 48 (refer to FIG. 1) that are respectively displayed at these displays are unlikely to be affected by light from the exterior of the vehicle 100, such as sunlight or the like, and provide visibility.

Third Modified Example

Figure 7:
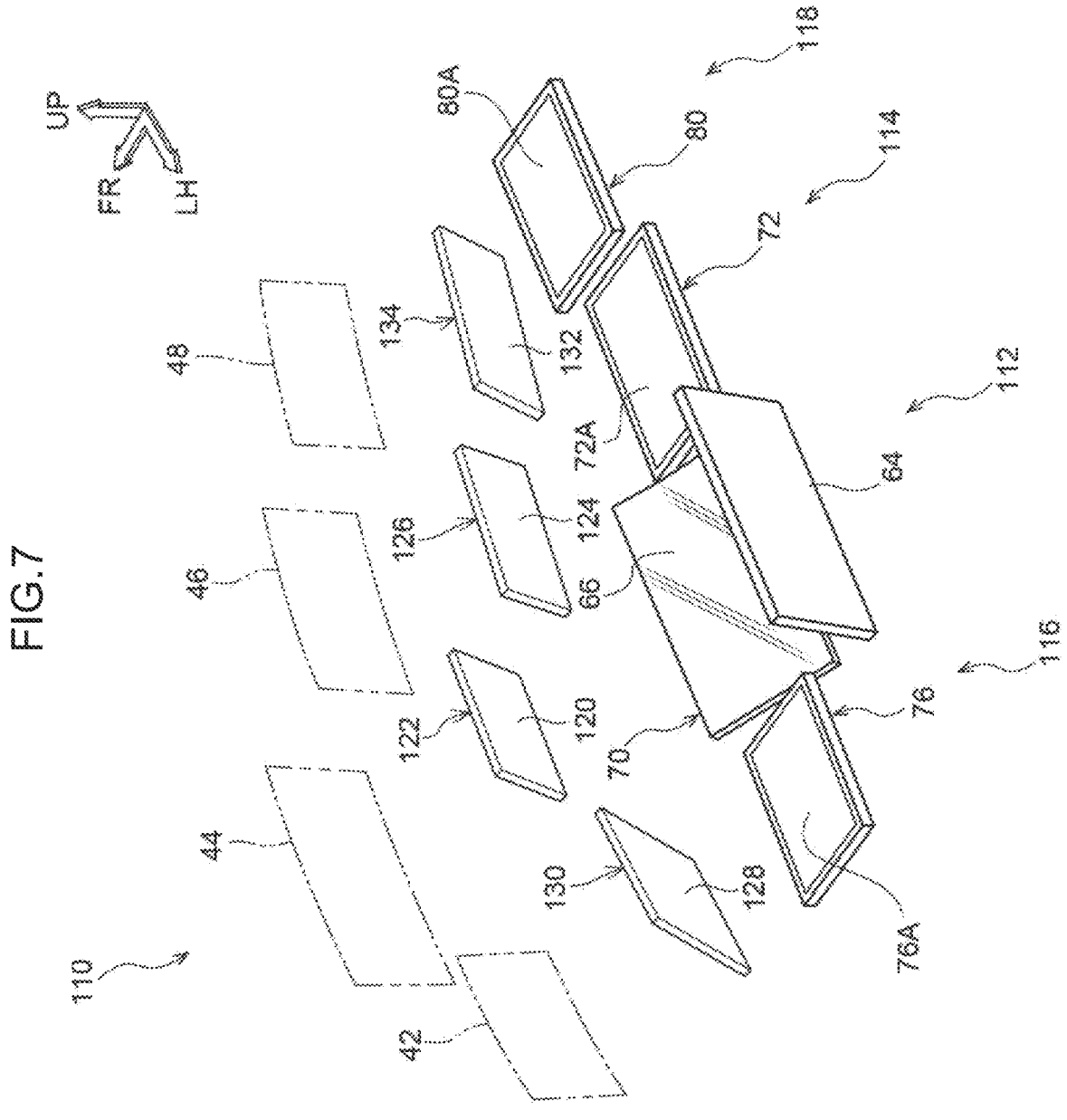
FIG. 7 is a rear perspective view, corresponding to FIG. 2, of respective display devices of a vehicle according to a third modified example, viewed from the vehicle left and rear oblique upper side.

As illustrated in FIG. 7, the vehicle 110 according to the third modified example is configured to include a meter display device 112 that displays the meter video image 44, a rearview mirror display device 114 that displays the rearview mirror video image 46, a left side mirror display device 116 that displays the left side mirror video image 42, and a right side mirror display device 118 that displays the right side mirror video image 48.

In the present modified example, the meter display device 112 includes the meter display 64, the meter mirror 70 (hereafter referred to as a "first meter mirror 70") including the first meter video image reflecting face 66, and a second meter mirror 122 including a second meter video image reflecting face 120 serving as a second meter video image reflecting face.

Further, the rearview mirror display device 114 includes the rearview mirror display 72, and a rearview mirror 126 including a rearview mirror video image reflecting face 124 serving as a camera video image reflecting face.

Moreover, the left side mirror display device 116 includes the left side display 76, and a left side mirror 130 including a left side mirror video image reflecting face 128 serving as a camera video image reflecting face.

Furthermore, the right side mirror display device 118 includes the right side display 80, and a right side mirror 134 including a right side mirror video image reflecting face 132 serving as a camera video image reflecting face.

Figure 8:
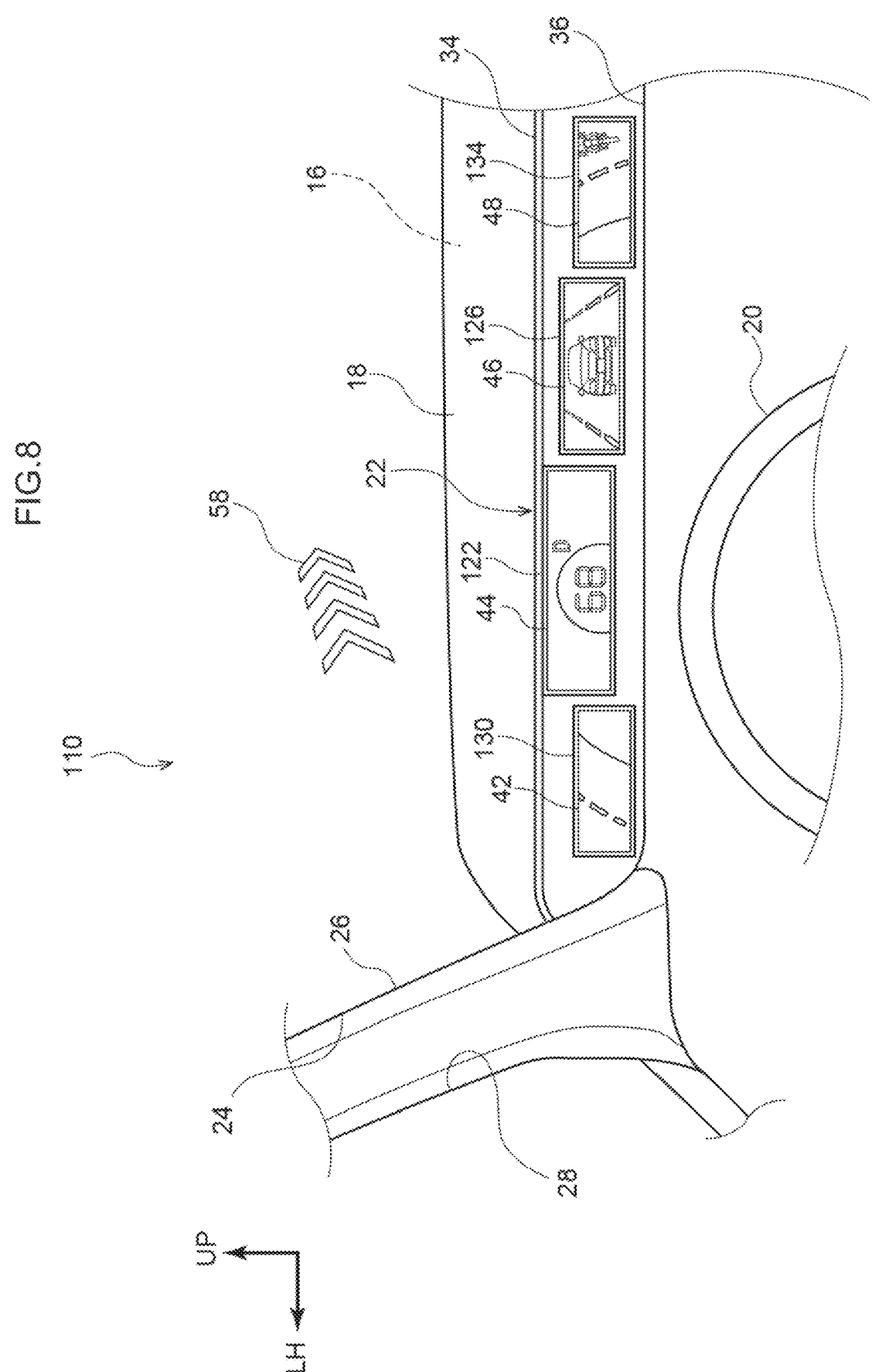
FIG. 8 is a schematic view, corresponding to FIG. 1, of a front portion within a vehicle cabin of the vehicle according to the third modified example, viewed from the vehicle rear side.

As illustrated in FIG. 8, the second meter mirror 122, the rearview mirror 126, the left side mirror 130, and the right side mirror 134 are all disposed at positions that are visible to the driver D seated in the driver's seat.

In this regard, the rearview mirror 126 is disposed so as to be offset toward the vehicle rear side with respect to the second meter mirror 122. Further, the left side mirror 130 and the right side mirror 134 are disposed so as to be further offset toward the vehicle rear side than the rearview mirror 126. The left side mirror 130 and the right side mirror 134 are disposed at substantially the same position in a vehicle side view.

As illustrated in FIG. 7, in the vehicle 110 according to the present modified example, due to the rearview mirror 126 being disposed so as to be offset with respect to the second meter mirror 122, a difference between an optical path of the meter video image 44 from the meter display 64 to the second meter video image reflecting face 120, and an optical path of the rearview mirror video image 46 from the rearview mirror display 72 to the rearview mirror video image reflecting face 124, can be increased, compared to the above exemplary embodiment. Further, due to the right side mirror 134 being disposed so as to be offset with respect to the rearview mirror 126, a difference between the optical path of the rearview mirror video image 46 from the rearview mirror display 72 to the rearview mirror video image reflecting face 124, and an optical path of the right side mirror video image 48 from the right side display 80 to the right side mirror video image reflecting face 132, can be increased, compared to the above exemplary embodiment. Thus, even with the same display arrangement as in the above exemplary embodiment, the differences in depth between the respective video images as viewed from the driver D are further increased. Consequently, the driver D can distinguish between the respective video images even more easily.

Moreover, in the vehicle 110 according to the present modified example, since the respective mirrors are independent from each other as illustrated in FIG. 8, a boundary between the left side mirror 130 and the second meter mirror 122, a boundary between the second meter mirror 122 and the rearview mirror 126, and a boundary between the rearview mirror 126 and the right side mirror 134, are each clear. Thus, the driver D can even more easily distinguish between the respective video images, compared with the above exemplary embodiment.

Fourth Modified Example

Figure 9:
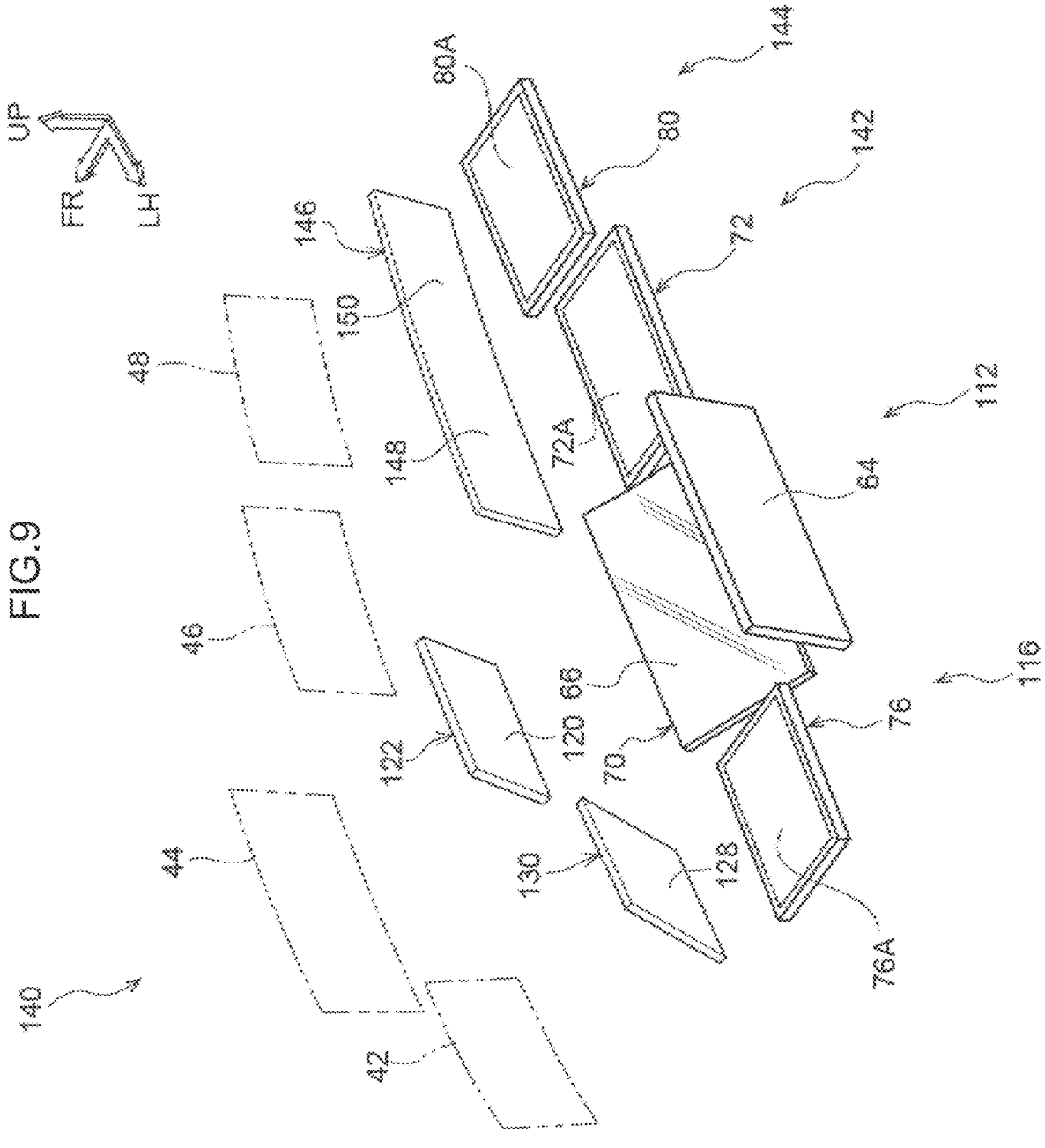
FIG. 9 is a rear perspective view, corresponding to FIG. 2, of respective display devices of a vehicle according to a fourth modified example, viewed from the vehicle left and rear oblique upper side.

As illustrated in FIG. 9, the vehicle 140 according to the fourth modified example is configured to include the meter display device 112 that displays the meter video image 44, a rearview mirror display device 142 that displays the rearview mirror video image 46, the left side mirror display device 116 that displays the left side mirror video image 42, and a right side mirror display device 144 that displays the right side mirror video image 48. It should be noted that, in the present modified example, configurations that are the same as in the third modified example are appended with the same reference numerals, and explanation thereof is appropriately omitted.

Figure 10:
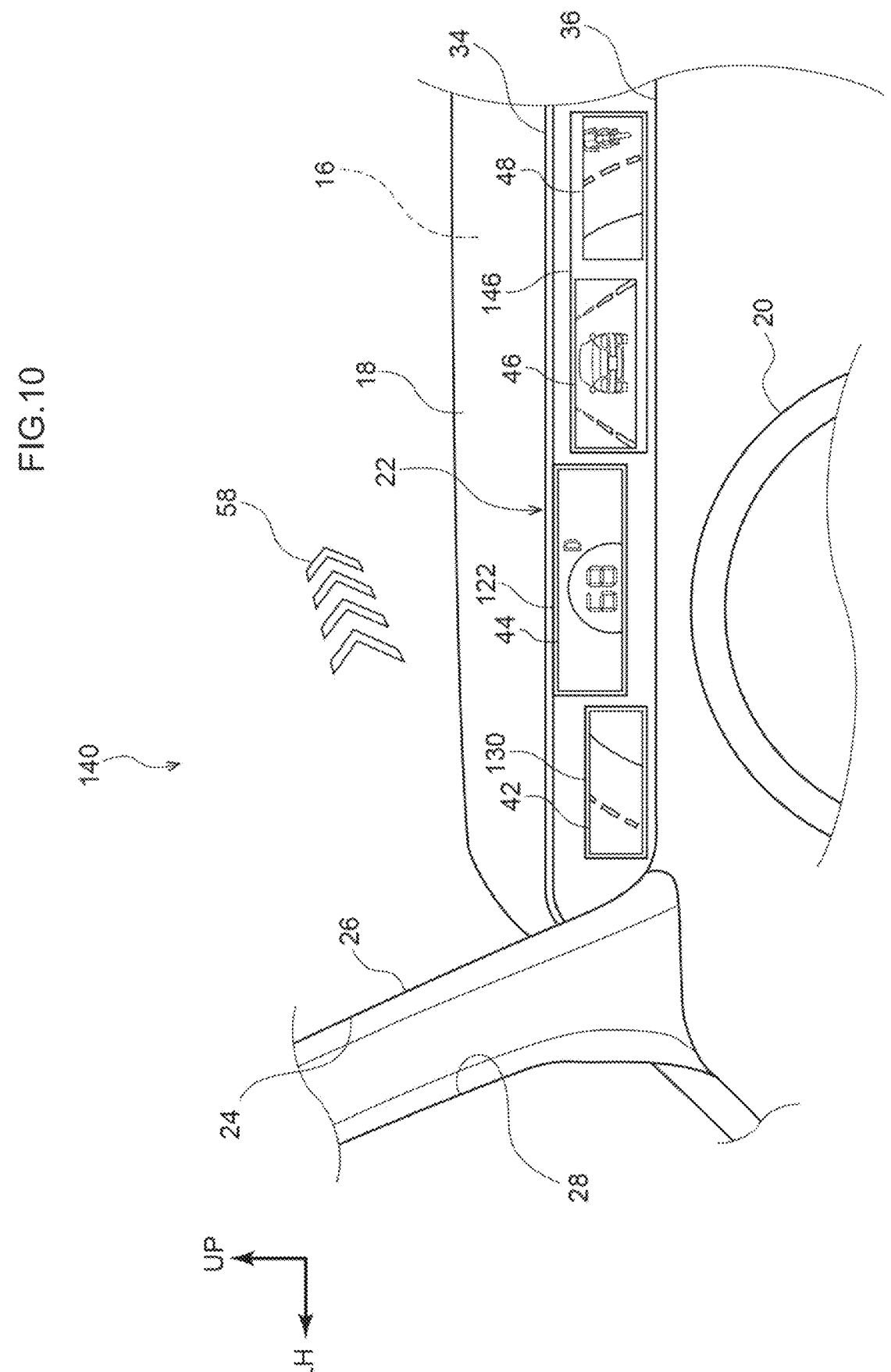
FIG. 10 is a schematic view, corresponding to FIG. 1, of a front portion within a vehicle cabin of the vehicle according to the fourth modified example, viewed from the vehicle rear side.

As illustrated in FIG. 10, a center mirror 146 is provided at a center portion in the vehicle width direction. As illustrated in FIG. 9, the center mirror 146 is disposed so as to be offset toward the vehicle rear side with respect to the second meter mirror 122. The center mirror 146 is disposed at substantially the same position as the left side mirror 130 in a vehicle side view.

The rearview mirror display device 142 includes the rearview mirror display 72, and the center mirror 146 including a rearview mirror video image reflecting face 148 serving as a camera video image reflecting face. Further, the right side mirror display device 118 includes the right side display 80, and the center mirror 146 including a right side mirror video image reflecting face 150 serving as a camera video image reflecting face. That is to say, the center mirror 146 is configured as a common mirror that forms the rearview mirror video image 46 and the right side mirror video image 48 as virtual images. As illustrated in FIG. 10, the center mirror 146 is disposed at a position that is visible to the driver D seated in the driver's seat.

In the vehicle 140 according to the present modified example, the left side mirror 130 and the center mirror 146 are each disposed so as to be offset toward the vehicle rear side with respect to the second meter mirror 122. Consequently, a boundary between the left side mirror 130 and the second meter mirror 122, and a boundary between the second meter mirror 122 and the center mirror 146, are each clear. Further, the left side mirror 130 and the center mirror 146 are provided at substantially the same depth as viewed from the driver D. Consequently, the driver D can intuitively distinguish the left side mirror video image 42, the rearview mirror video image 46, and the right side mirror video image 48, which are information about the vehicle periphery, from the meter video image 44. Thus, the peripheral field of view of the vehicle can be intuitively recognized. It should be noted that, in the present modified example, although it has been explained that the rearview mirror video image 46 is projected onto the center mirror 146 by the rearview mirror display 72, and that the right side mirror video image 48 is projected onto the center mirror 146 by the right side mirror display 80, there is no limitation thereto, and light including the rearview mirror video image 46 and the right side mirror video image 48 may be emitted from a common display. Further, the center mirror 146 may be divided in two. That is to say, the rearview mirror and the right side mirror may be configured separately and disposed at the same depth.

It should be noted that, in the above exemplary embodiment, the first modified example, and the fourth modified example, although it has been explained that the respective displays are disposed so as to be offset from each other, there is no limitation thereto. For example, the displays may be disposed at the same position in a vehicle side view, and the respective mirrors may be disposed so as to be offset from each other, as in the fourth modified example.

With regard to the above exemplary embodiment, the following additional notes are further disclosed.

Additional Note 1

A vehicle comprising:

a meter display device that displays a meter video image at a front side of a vehicle cabin and at a vehicle front side of a driver's seat; and a camera display device that displays a camera video image capturing a peripheral field of view of the vehicle, at a position peripheral to the meter video image as viewed from the driver's seat and at a position that is offset toward a vehicle front side or a vehicle rear side with respect to the meter video image.

Additional Note 2

The vehicle according to Additional Note 1, wherein:

an upper end of the camera video image is positioned at a height that is higher than or even with a height of a center of the meter video image in a vehicle up-down direction; and a lower end of the camera video image is positioned at a height that is lower than or even with the height of the center of the meter video image in the vehicle up-down direction.

Additional Note 3

The vehicle according to Additional Note 1 or Additional Note 2, wherein:

the camera display device includes:

a driver's seat side side mirror display device that displays a driver's seat side electronic side mirror video image capturing a driver's seat side rear side of the vehicle, a passenger seat side side mirror display device that displays a passenger seat side electronic side mirror video image capturing a passenger seat side rear side of the vehicle, and a rearview mirror display device that displays an electronic rearview mirror video image capturing directly behind the vehicle; and displays that are visually recognized by a user seated in the driver's seat are arranged in an order of the driver's seat side electronic side mirror video image, the meter video image, the electronic rearview mirror video image, and the passenger seat side electronic side mirror video image, from a driver's seat side toward a passenger seat side.

Additional Note 4

The vehicle according to Additional Note 3, wherein the electronic rearview mirror video image that is visually recognized by the user is positioned further toward the vehicle rear side than the meter video image and further toward the vehicle front side than the passenger seat side electronic side mirror video image.

Additional Note 5

The vehicle according to any one of Additional Note 1 to Additional Note 4, wherein:

the meter display device includes a meter video image light emitting portion that emits light that shows the meter video image, and at least one meter video image reflecting face that reflects light of the meter video image that has been emitted from the meter video image light emitting portion, the meter display device displaying the meter video image by forming a meter virtual image further toward the vehicle front side than a meter video image reflecting face that reflects the light of the meter video image last; and the camera display device includes a camera video image light emitting portion that emits light that shows the camera video image, and includes at least one camera video image reflecting face that reflects light that has been emitted from the camera video image light emitting portion, the camera display device displaying the camera video image by forming a camera virtual image further toward the vehicle front side than a camera video image reflecting face that reflects the light of the camera video image last, and at a position that is offset toward the vehicle front side or the vehicle rear side with respect to the meter virtual image.

What is claimed is:

1. A vehicle comprising:

a meter display device that displays a meter video image at a front side of a vehicle cabin and at a vehicle front side of a driver's seat; and a camera display device that displays a camera video image capturing a peripheral field of view of the vehicle, at a position peripheral to the meter video image as viewed from the driver's seat and at a position that is offset toward a vehicle front side or a vehicle rear side with respect to the meter video image, wherein:

the meter display device includes a meter video image light emitting portion that emits light that shows the meter video image, and at least one meter video image reflecting face that reflects light of the meter video image that has been emitted from the meter video image light emitting portion, the meter display device displaying the meter video image by forming a meter virtual image further toward the vehicle front side than a meter video image reflecting face that reflects the light of the meter video image last; and the camera display device includes a camera video image light emitting portion that emits light that shows the camera video image, and includes at least one camera video image reflecting face that reflects light that has been emitted from the camera video image light emitting portion, the camera display device displaying the camera video image by forming a camera virtual image further toward the vehicle front side than a camera video image reflecting face that reflects the light of the camera video image last, and at a position that is offset toward the vehicle front side or the vehicle rear side with respect to the meter virtual image.

2. The vehicle according to claim 1, wherein an upper end of the camera video image is positioned at a height that is higher than or even with a height of a center of the meter video image in a vehicle up-down direction; and a lower end of the camera video image is positioned at a height that is lower than or even with the height of the center of the meter video image in the vehicle up-down direction.

3. The vehicle according to claim 1, wherein:

the camera display device includes:

a driver side mirror display device that displays a driver's seat side electronic side mirror video image capturing a driver's seat side rear side of the vehicle, a passenger side mirror display device that displays a passenger seat side electronic side mirror video image capturing a passenger seat side rear side of the vehicle, and a rearview mirror display device that displays an electronic rearview mirror video image capturing directly behind the vehicle; and displays that are visually recognized by a user seated in the driver's seat are arranged in an order of the driver's seat side electronic side mirror video image, the meter video image, the electronic rearview mirror video image, and the passenger seat side electronic side mirror video image, from a driver's seat side toward a passenger seat side.

4. The vehicle according to claim 3, wherein the electronic rearview mirror video image that is visually recognized by the user is positioned further toward the vehicle rear side than the meter video image and further toward the vehicle front side than the passenger seat side electronic side mirror video image.

5. The vehicle according to claim 3, wherein the driver's seat side electronic side mirror video image that is visually recognized by the user is positioned at a depth that is the same as a depth of the passenger seat side electronic side mirror video image.

6. The vehicle according to claim 1, further comprising a head-up display device that projects a travel-related video image including travel-related information of the vehicle onto a windshield glass.

7. The vehicle according to claim 1, wherein the meter virtual image and the camera virtual image are formed at a vehicle front side of a visual recognition mirror that is visually recognized by a user.

8. The vehicle according to claim 7, wherein the meter display device includes a first meter video image reflecting face that reflects light of the meter video image that has been displayed at the meter video image light emitting portion, and a second meter video image reflecting face that reflects light of the meter video image that has been reflected by the first meter video image reflecting face, toward the vehicle rear side, the second meter video image reflecting face being a portion of the visual recognition mirror.

9. The vehicle according to claim 8, wherein the camera video image reflecting face is a portion of the visual recognition mirror.

10. The vehicle according to claim 9, wherein the meter video image light emitting portion, the first meter video image reflecting face, and the camera video image light emitting portion are disposed at positions that are not visible to the user seated in the driver's seat.

11. The vehicle according to claim 7, wherein the visual recognition mirror is a concave mirror that is concave toward the vehicle front side.

12. The vehicle according to claim 7, wherein a reflecting face of the visual recognition mirror faces toward a vehicle lower side and the vehicle rear side.

13. The vehicle according to claim 1, further comprising an instrument panel that extends substantially in a vehicle width direction at a front portion of the vehicle cabin, wherein:

the instrument panel includes an upper portion panel that is provided at a vehicle front side upper portion thereof, a main panel that is provided at a vehicle rear side thereof, and a concave portion that is provided between the upper portion panel and the main panel and that is formed so as to be concave toward a vehicle lower side in a side cross-sectional view; and the meter display device and the camera display device are accommodated in an accommodation portion that is surrounded by the concave portion and a lower plate portion that is formed at a lower portion of the upper portion panel, at a lower side of the upper portion panel.

14. A vehicle comprising:

a meter display device that displays a meter video image at a front side of a vehicle cabin and at a vehicle front side of a driver's seat; and a camera display device that displays a camera video image capturing a peripheral field of view of the vehicle, at a position peripheral to the meter video image as viewed from the driver's seat and at a position that is offset toward a vehicle front side or a vehicle rear side with respect to the meter video image, wherein an upper end of the camera video image is positioned at a height that is higher than or even with a height of a center of the meter video image in a vehicle up-down direction; and a lower end of the camera video image is positioned at a height that is lower than or even with the height of the center of the meter video image in the vehicle up-down direction.

15. The vehicle according to claim 14, further comprising a head-up display device that projects a travel-related video image including travel-related information of the vehicle onto a windshield glass.

16. The vehicle according to claim 14, further comprising an instrument panel that extends substantially in a vehicle width direction at a front portion of the vehicle cabin, wherein:

the instrument panel includes an upper portion panel that is provided at a vehicle front side upper portion thereof, a main panel that is provided at a vehicle rear side thereof, and a concave portion that is provided between the upper portion panel and the main panel and that is formed so as to be concave toward a vehicle lower side in a side cross-sectional view; and the meter display device and the camera display device are accommodated in an accommodation portion that is surrounded by the concave portion and a lower plate portion that is formed at a lower portion of the upper portion panel, at a lower side of the upper portion panel.

17. A vehicle comprising:

a meter display device that displays a meter video image at a front side of a vehicle cabin and at a vehicle front side of a driver's seat; and a camera display device that displays a camera video image capturing a peripheral field of view of the vehicle, at a position peripheral to the meter video image as viewed from the driver's seat and at a position that is offset toward a vehicle front side or a vehicle rear side with respect to the meter video image, wherein the camera display device includes:

a driver side mirror display device that displays a driver's seat side electronic side mirror video image capturing a driver's seat side rear side of the vehicle, a passenger side mirror display device that displays a passenger seat side electronic side mirror video image capturing a passenger seat side rear side of the vehicle, and a rearview mirror display device that displays an electronic rearview mirror video image capturing directly behind the vehicle; and wherein displays that are visually recognized by a user seated in the driver's seat are arranged in an order of the driver's seat side electronic side mirror video image, the meter video image, the electronic rearview mirror video image, and the passenger seat side electronic side mirror video image, from a driver's seat side toward a passenger seat side.

18. The vehicle according to claim 17, wherein the electronic rearview mirror video image that is visually recognized by the user is positioned further toward the vehicle rear side than the meter video image and further toward the vehicle front side than the passenger seat side electronic side mirror video image.

19. The vehicle according to claim 17, wherein the driver's seat side electronic side mirror video image that is visually recognized by the user is positioned at a depth that is the same as a depth of the passenger seat side electronic side mirror video image.

* * * * *